Sept. 9, 1941. G. W. GRAY 2,255,161
GASKET FOR HOSE COUPLINGS AND METHOD OF RECONDITIONING THE SAME
Filed Oct. 9, 1939
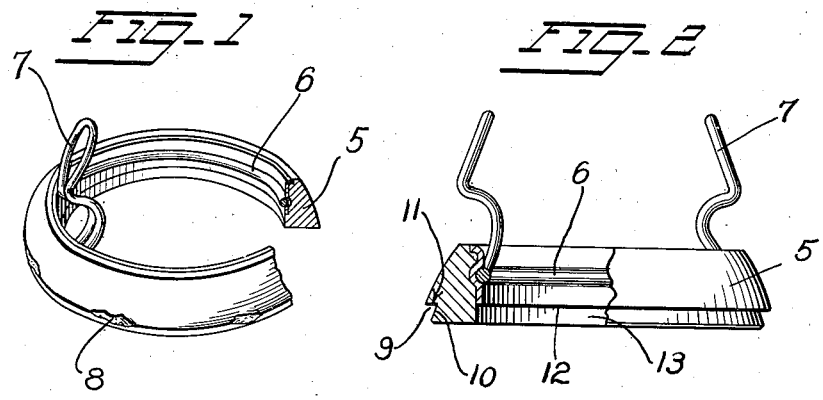
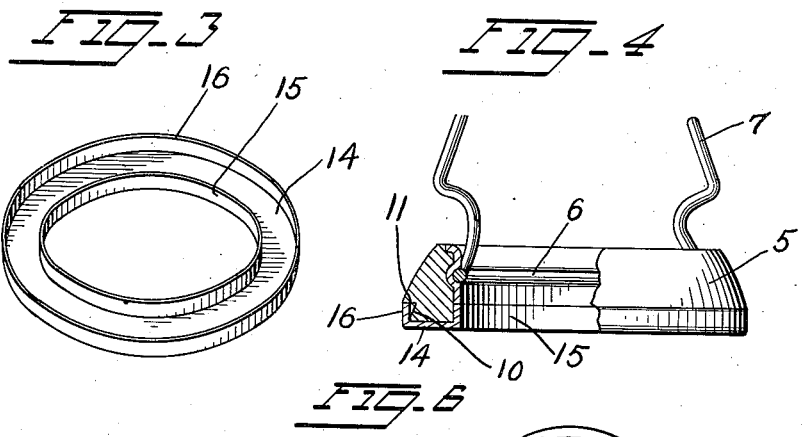
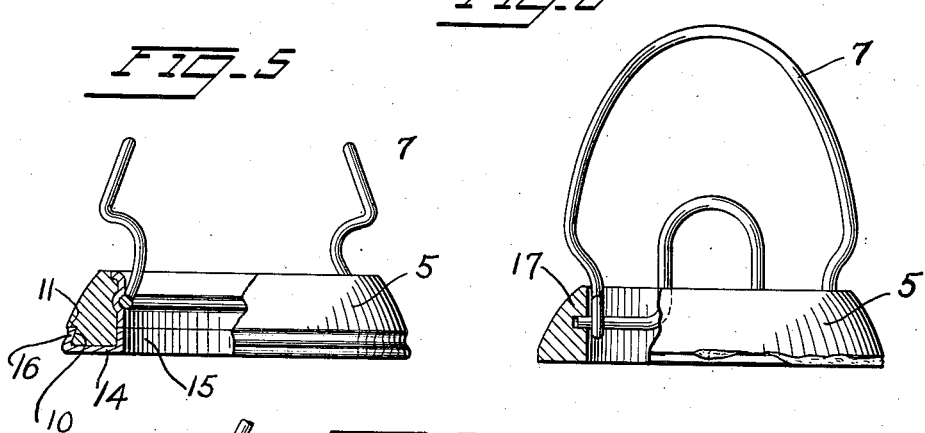
Inventor
G. W. Gray.
By
Attorney Patented Sept. 9, 1941

2,255,161

UNITED STATES PATENT OFFICE 2,255,161

GASKET FOR HOSE COUPLINGS AND METHOD OF RECONDITIONING THE SAME

Griffin W. Gray, Roanoke, Va., assignor of one-half to Charlie B. Wade, Roanoke, Va.

Application October 9, 1939, Serial No. 298,662

2 Claims. (Cl. 29—148.2)

This invention relates to gaskets for hose couplings of train pipes and the like and more particularly to a novel method of reconditioning said gaskets.

It is a well known fact that the gaskets of hose couplings are subject to considerable wear and rough usage incident to repeated coupling and uncoupling of adjacent hose sections with the result that the edges and other portions of the gaskets soon become scarred, broken or otherwise mutilated so as to render said gaskets unfit for further use and necessitating replacement thereof at frequent intervals by new gaskets. At the present time these worn or scarred gaskets are valueless for any useful purpose and are generally thrown on the scrap pile or otherwise discarded after new gaskets have been installed, thereby causing a needless waste of material with a resultant increase in the cost of maintenance.

The object of the present invention is to provide a novel method of refinishing or reconditioning such worn or discarded gaskets which method includes the step of renewing the seating surfaces of the gaskets thereby to permit continued use thereof and consequently prolong the effective life of said gaskets.

A further object of the invention is to provide a gasket for hose couplings, the seating face of which is covered by a metallic repair plate or shim having spaced upstanding circumferential flanges engaging the inner and outer walls of the gasket and retained in position thereon by pressing or rolling the metal constituting the outer flange laterally within an under-cut seating groove formed in the body of the gasket.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a perspective view, partly in section, of a worn or discarded standard gasket before being reconditioned, Figure 2 is a side elevation, partly in section, showing the first step in the reconditioning process, that is to say, with the inner wall of the gasket bored out to receive the inner flange of the repair plate or shim and the outer wall of the gasket formed with an under-cut seating groove for the reception of the outer flange of the shim, Figure 3 is a perspective view of the metallic repair plate or shim detached, Figure 4 is a side elevation showing the repair plate or shim in position on the seating face of the gasket and ready to be fastened in position thereon, Figure 5 is a similar view showing how the outer flange of the repair plate or shim is pressed within the under-cut seating groove to lock the shim in position on the gasket, Figure 6 is a side elevation, partly in section, of a standard all metal gasket, and Figure 7 is a detail sectional view showing the manner of reconditioning said metal gasket.

Standard gaskets of train pipe hose couplings are generally molded or otherwise formed of hard composite material which is subject to chipping, scarring or mutilation incident to coupling and uncoupling adjacent hose sections, and in Figure 1 of the drawing, there is illustrated a standard gasket, in which 5 designates the composite body portion, 6 the grooved metallic lining and 7 the spring retaining member seated within the groove of the lining in the usual manner.

In carrying my improved method into effect, I take a discarded gasket, the edges of which are mutilated, as indicated at 8 in Figure 1 of the drawing, and ream or otherwise cut into the exterior wall of the body portion 5 at the mutilated portion 8 thereof to form a seating groove 9, the inner wall of which is preferably undercut, at 10, to form an inwardly extending stop shoulder 11. During the cutting or reaming operation, the scarred or mutilated portion 8 of the discarded gasket is removed so that the lower or seating face 12 of the gasket presents a flat unbroken surface, with the exception of the seating groove 9. I then bore out the inner wall of the gasket immediately beneath the metallic lining 6 to form a circumferential channel 13 of a depth substantially equal to the thickness of the lining 6. After the mutilated gasket has been cut in the manner just described, I position on the seating surface 12 of the gasket a metallic repair plate or shim 14. The shim 14 is preferably constructed of copper and is provided with inner and outer upstanding circumferential flanges 15 and 16, one of which fits within the channel 13 while the other enters the seating groove 9, as best shown in Figure 4 of the drawing. I then roll or press the metal constituting the outer flange 16 inwardly with a suitable tool so as to cause the inner face of the flange 16 to contact with the under-cut wall 10 of the groove 9 and the upper edge of said flange to engage the stop shoulder 11, as best shown in Figure 5 of the drawing, thereby firmly securing the shim or repair plate in position on the gasket and providing a new seating or contacting surface for said gasket so as to permit reuse of the discarded gasket and thus materially prolong the effective life thereof. After the metallic repair plate or shim has been pressed into position on the gasket, the exterior walls of the gasket are trimmed or finished so as to be flush with the adjacent portion of the outer flange 16 and thus not present any surface obstruction which would tend to interfere with the proper functioning of the gasket. It will here be noted that the thickness of the inner flange 15 is substantially the same as the thickness of the lining 6 so that, when the shim is positioned on the gasket, the vertical wall of the inner flange 15 will be disposed flush with the outer wall of the lining 6, as best shown in Figure 5 of the drawing.

In Figure 6 of the drawing, I have illustrated a standard construction of all metal gasket before being reconditioned, and in Figure 7 of the drawing, I have shown how the all metal gasket is reconditioned. In this form of the device, the mutilated lower edge of the metal body portion 17 is cut-away in the same manner as the composite type of gasket shown in Figure 2 so as to receive the metal cover plate or shim 18, the outer flange of the shim being pressed or rolled inwardly within the outer under-cut groove, as indicated at 19, in the manner previously described. In some cases, when reconditioning metallic gaskets, it is not necessary to bore or ream out the inner wall of the gasket to accomodate the inner flange of the shim, but in order to get the best results, it is preferred to do so.

While the invention is primarily directed to the reconditioning or refinishing of worn or damaged gaskets, it will be understood that new gaskets may be constructed in the same manner without departing from the spirit of the invention. It will, furthermore, be understood that the metallic repair plate or shim may be applied to any style or type of gasket either when reconditioning the gasket or during the manufacture thereof.

Having thus described the invention, what is claimed as new is:

1. The method of reconditioning worn gaskets which consists in boring out the inner wall of the gasket to form an annular channel and cutting away the outer wall at the worn portion thereof to form an exterior circumferential seating groove having an undercut wall defining a stop shoulder, positioning a metallic repair plate having spaced integral upstanding inner and outer flanges over the seating surface of the gasket with the inner flange fitting within the channel and the outer flange extending within the circumferential groove and in contact with said stop shoulder, pressing the outer flange inwardly against the undercut wall of the circumferential groove and subsequently trimming the outer wall of the gasket to produce a substantially smooth surface at the junction of the pressed portion of the outer flange and the adjacent portion of said outer wall.

2. A gasket for hose couplings comprising an annular body portion having its outer wall near the seating surface thereof formed with a circumferential seating groove having an undercut wall defining a stop shoulder, and a metallic plate having an inner upstanding flange fitting within the annular body portion and an outer integral upstanding flange pressed in the seating groove against the undercut wall thereof and in firm contact with the stop shoulder to lock the plate in position on the gasket, the outer wall of the gasket being substantially flush with the adjacent end of said outer flange.

GRIFFIN W. GRAY.